Dec. 26, 1944.  E. A. RYDER  2,365,843
TEMPERATURE CONTROL FOR AIRCRAFT INSTRUMENTS
Filed Jan. 29, 1944
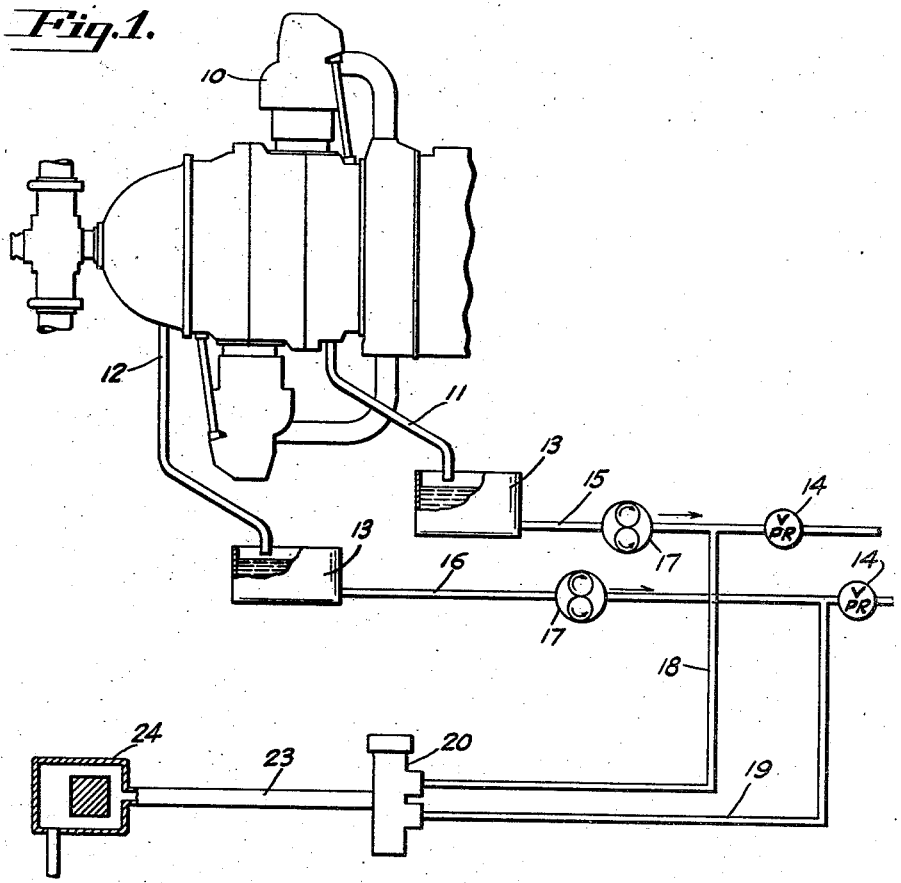
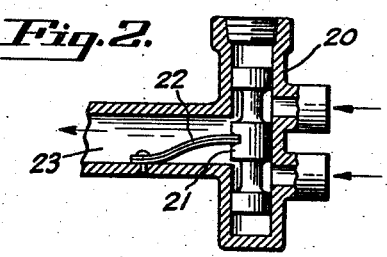
INVENTOR
*Earle A. Ryder*
BY *Charles L. Shelton*
ATTORNEY Patented Dec. 26, 1944

2,365,843

UNITED STATES PATENT OFFICE 2,365,843

TEMPERATURE CONTROL FOR AIRCRAFT INSTRUMENTS

Earle A. Ryder, West Hartford, Conn., assignor to United Aircraft Corporation, East Hartford, Conn., a corporation of Delaware Application January 29, 1944, Serial No. 520,253

4 Claims. (Cl. 237—2)

This invention relates to temperature controlling means for maintaining aircraft instruments at a substantially predetermined constant temperature. More particularly the invention relates to temperature regulating means for a casing or enclosure for one or more precision instruments of the above type, such as an electric torque meter, electric strain gage, or other indicating and recording instrument adapted for use in modern aircraft, the indications of which may be adversely affected by variations in temperature.

A primary object of the present invention is to make use of heated oil as it drains from different sections of an aircraft engine where the oil is heated to widely different temperatures so that when mixed in variable proportions the temperature of the resultant mixture may be maintained at a predetermined constant intermediate temperature.

Another object of the invention is to provide a simple temperature controlled mixing valve which will control the relative amounts of oil at different temperatures so that when mixed the resultant temperature of the oil passing the valve may be maintained substantially constant.

Other objects and advantages of the invention will be apparent from the specification and claims, and from the drawing which illustrates what now is considered to be a preferred embodiment.

In the drawing:

Fig. 1 is a diagrammatic view of a fluid mixing device and temperature control therefor associated with the lubricant drains from separated sections of an aircraft engine, and Fig. 2 is a central sectional view showing one form of mixing valve that may be used in connection with the present invention.

In its preferred form, the invention may include the following principal parts: First, individual conduits leading from tanks connected to drains from the lower parts of separate sections of an aircraft engine; second, pumps connected to these discharge conduits for forcing the oil therein to a mixing valve; third, a balanced mixing valve having its casing connected to the conduits; fourth, a bimetallic strip within the discharge portion of the casing controlling the position of the mixing valve in accordance with variations in temperature in said discharge portion, and a discharge conduit from said mixing valve to the instrument casing or housing desired to be maintained at a constant temperature.

In the operation of aircraft engines and their accessories it is essential, in order that accurate readings may be obtained from electrical and other indicating instruments employed in connection with the engine or associated parts, that the instruments be maintained at a substantially constant temperature. Instruments such as electric torque meters, electric strain gages and the like for accurate and correct determinations must be maintained either at a substantially constant temperature or some complicated temperature compensating means for thermal variations provided for them. In the embodiment of the invention illustrated, the instruments and their housings are maintained at a constant temperature by mixing lubricating oils at different temperatures, the resultant temperature of which is maintained constant by varying the proportions of the oils as their temperatures vary, and the mixture being circulated through or around the instrument casing.

Referring more in detail to the figures of the drawing, it will be seen in Fig. 1 that separated sections of an aircraft engine 10 have discharge conduits 11 and 12, one leading from the crankcase or power section of the engine and the second discharge or drain pipe leading from the propeller transmission section at the front end of the engine. These two discharges or conduits 11 and 12 lead from the bottoms of the casings for their respective sections and may be connected to suitable tanks 13. From tanks 13 the oil is forced past suitable pressure relief valves 14 in conduits 15 and 16 by means of individual pumps 17 preferably of gear or other conventional type.

Beyond the discharge pumps 17 in these conduits 15 and 16 are branch conduits 18 and 19 leading to separated but adjacent intakes in the casing 20 of a mixing valve. In the conduits 15 and 16 beyond the pumps 17 and beyond the branch conduits 18 and 19 are the pressure relief valves 14 so that the pressure of the oil admitted to the intakes of the mixing valve 20 may be regulated thereby.

In order to maintain a predetermined temperature of the oil passing the valve 21, advantage is taken of the fact that oil drained from different sections of an aircraft engine is at widely different temperatures. The oil drained into conduit 11 from the crankcase of the engine power section is at a relatively high temperature, approximately between two hundred degrees and three hundred degrees Fahrenheit, while that drained into conduit 12 from the propeller transmission or from the accessory section of the engine, the temperature is substantially lower, that is, about one hundred and sixty degrees or one hundred and seventy degrees Fahrenheit. By mixing varied proportions of these two supplies of lubricant or other fluid, a resultant substantially constant temperature of fluid may be obtained.

In order to provide suitable controlling means for continuously mixing these two supplies of fluids, a valve 21 of the balanced spool type may be employed, the position of the valve within its cylinder or casing 20 and relative to the intakes from conduits from the engine being controlled by a thermally responsive member, such as a bimetallic strip 22. The spool 21 forming the mixing valve shown in Fig. 2 is provided with a central head and heads at its opposite ends, these heads being spaced apart by neck portions past which the oil may enter the discharge passage 23. In the central position of the valve 21 as indicated in Fig. 2, substantially equal amounts of oil from each intake at different temperatures may pass the valve 21 into its discharge chamber of the valve casing 20 and into conduit 23. If the resultant temperature of the mixture varies from the predetermined desired temperature for which the valve is adjusted, the valve 21 will be moved axially by flexure of the metallic strip 22 to admit more oil from one intake and less from the other past the valve and into the discharge conduit 23 leading to the instrument casing 24.

As shown in Fig. 2 this bimetallic strip 22 at one end is attached in fixed position to a portion of the casing 20 on the discharge side of the valve 21. The opposite end of the strip engages a transverse slot provided in the central head of the valve spool 21 so that any variation in the discharge temperature of the mixture flowing through the valve casing varies the position of the valve 21 to increase the admission of one supply and decrease the other. From the casing 20 of the mixing valve the discharge conduit 23 leads to one or more casings 24 housing one or more instruments which may include springs or other parts whose operation would be affected by temperature changes. The flow of oil at substantially constant temperature, however, prevents such temperature changes from taking place.

It is to be understood that the invention is not limited to the specific embodiment herein illustrated and described, but may be used in other ways without departure from the spirit of the invention as defined by the following claims:

1. In an aircraft engine having sumps into which oil at different temperatures may drain from separated parts of said engine, pumps forcing oil from said sumps to a mixing valve, thermostatic means controlling the relative amounts of oil passed by said pumps from said sumps to a discharge line, and an instrument housing supplied with the oil within said discharge line, whereby the temperature of said instrument housing may be maintained constant.

2. A temperature control for aircraft instruments comprising in combination an aircraft engine having a hot oil sump and a relatively cool oil sump, conduits from said sumps, a mixing valve having intakes connected individually to said conduits, a discharge conduit from said mixing valve, and a thermostat control for varying the openings respectively from said hot and cold conduits to said discharge conduits, said thermostat control being housed within said discharge conduit and said discharge conduit extending from said valve to an instrument housing.

3. A temperature control for aircraft instruments comprising in combination an aircraft engine having a hot oil sump and a relatively cool oil sump, conduits from said sumps, a mixing valve having intakes connected individually to said conduits, a discharge conduit from said mixing valve, and a thermostatically controlled balanced valve for varying the openings respectively from said hot and cold conduits to said discharge conduit, said thermostat control being housed within said discharge conduit and said discharge conduit extending to an instrument panel board.

4. A temperature control for aircraft instruments comprising in combination an aircraft engine having a hot oil sump and a relatively cool oil sump connected to separate portions of an engine, conduits from said sumps, pumps in said conduits, pressure controlling means for said conduits, a mixing valve having intakes connected individually to said conduits, a discharge conduit from said mixing valve, and a thermostat control for varying the openings respectively from said hot and cold conduits to said discharge conduit, said thermostat control being housed within said discharge conduit and said discharge conduit extending to an instrument panel board.

EARLE A. RYDER.